US011199471B2

(12) United States Patent
He et al.

(10) Patent No.: US 11,199,471 B2
(45) Date of Patent: Dec. 14, 2021

(54) SYSTEM AND METHOD FOR TESTING AERODYNAMIC CHARACTERISTIC OF HIGH-SPEED MOVING VEHICLE-BRIDGE SYSTEM AND SUBSIDIARY FACILITIES THEREOF UNDER CROSSWIND

(71) Applicants: Central South University, Changsha (CN); National Engineering Laboratory for Construction Technology of High Speed Railway, Changsha (CN)

(72) Inventors: Xuhui He, Changsha (CN); Simin Zou, Changsha (CN); Hanfeng Wang, Changsha (CN)

(73) Assignees: CENTRAL SOUTH UNIVERSITY, Changsha (CN); NATIONAL ENGINEERING LABORATORY FOR CONSTRUCTION TECHNOLOGY OF HIGH SPEED RAILWAY, Changsha (CN)

( * ) Notice: Subject to any disclaimer, the term of this patent is extended or adjusted under 35 U.S.C. 154(b) by 15 days.

(21) Appl. No.: 16/923,121

(22) Filed: Jul. 8, 2020

(65) Prior Publication Data

US 2020/0333212 A1 Oct. 22, 2020

Related U.S. Application Data

(63) Continuation-in-part of application No. PCT/CN2019/085920, filed on May 8, 2019.

(30) Foreign Application Priority Data

May 8, 2018 (CN) .......................... 201810432727.5

(51) Int. Cl.
*G01M 9/04* (2006.01)
*G01M 9/06* (2006.01)
*G01P 3/36* (2006.01)

(52) U.S. Cl.
CPC ................. *G01M 9/04* (2013.01); *G01M 9/06* (2013.01); *G01P 3/36* (2013.01)

(58) Field of Classification Search
CPC .......... G01M 9/04; G01M 9/06; G01M 17/08; G01M 9/02; G01M 9/08; G01P 3/36
See application file for complete search history.

(56) References Cited

U.S. PATENT DOCUMENTS 2,734,702 A * 2/1956 Northrop et al. ......... B64F 1/10
244/63
7,841,233 B2 * 11/2010 Cogotti .................... G01M 9/04
73/147
10,254,195 B1 * 4/2019 Braam ...................... G01L 9/02

FOREIGN PATENT DOCUMENTS

CN 101750219 A 6/2010
CN 101968399 A 2/2011
(Continued)

*Primary Examiner* — Freddie Kirkland, III
(74) *Attorney, Agent, or Firm* — Bayramoglu Law Offices LLC (57) ABSTRACT

A system for testing aerodynamic characteristics of a high-speed moving vehicle-bridge system and subsidiary facilities thereof under a crosswind includes a vehicle model, a starting mechanism, a buffer mechanism, a wind tunnel test section and guide rails. The guide rails pass through the wind tunnel test section; the starting mechanism and the buffer mechanism are separately located at both ends of the guide rails. The guide rails include an acceleration section and a deceleration section. The starting mechanism is located in the acceleration section, and the buffer mechanism is located in the deceleration section; the vehicle model starts to run at the starting mechanism and stops at the buffer mechanism;

(Continued)

an instantaneous speed of the vehicle model in the acceleration section is not less than 100 km/h. The present invention carries out simulation tests on various infrastructures, their subsidiary facilities and trains through scale models.

12 Claims, 4 Drawing Sheets

(56) References Cited

FOREIGN PATENT DOCUMENTS

| CN | 102944434 | A | * | 2/2013 | ............ G01M 17/08 |
|----|-----------|---|---|--------|----------|
| CN | 102944434 | A |   | 2/2013 | |
| CN | 105109685 | A |   | 12/2015 | |
| CN | 108398226 | A |   | 8/2018 | |
| CN | 208458971 | U |   | 2/2019 | |
| JP | 2016011858 | A |   | 1/2016 | |

* cited by examiner

SYSTEM AND METHOD FOR TESTING AERODYNAMIC CHARACTERISTIC OF HIGH-SPEED MOVING VEHICLE-BRIDGE SYSTEM AND SUBSIDIARY FACILITIES THEREOF UNDER CROSSWIND

CROSS REFERENCE TO THE RELATED APPLICATIONS

This application is the continuation-in-part application of International Application No. PCT/CN2019/085920, filed on May 8, 2019, which is based upon and claims priority to Chinese Patent Application No. 201810432727.5, filed on May 8, 2018, the entire contents of which are incorporated herein by reference.

TECHNICAL FIELD

The present invention relates to the technical field of simulation tests of aerodynamic characteristics of high-speed vehicle-bridge systems, in particular to a system and method for testing aerodynamic characteristics of a high-speed moving vehicle-bridge system and subsidiary facilities thereof under a crosswind.

BACKGROUND

While we are pursuing high-speed speed transportation, safety should always come first. However, traffic safety accidents caused by strong winds often occur. Since the beginning of railway transportation in Japan, 28 train accidents caused by strong winds occurred. The Eurostar has ever been forced to shut down due to strong winds. There have also been many accidents in China's Humen Bridge where vehicles were overturned by strong winds. When vehicles are moving on the bridge, the dynamic impact of the vehicles will cause the bridge structure to vibrate, and the vibration will in turn affect the safe operation of the vehicles. The dynamic interaction between the vehicles and the bridge is enhanced under strong winds, and the aerodynamic characteristics of the bridge change as the vehicles arrive and depart. The vehicles on the bridge are in the flow around the cross section of the bridge. The mutual aerodynamic interference of the vehicles and the bridge is very complex, making the aerodynamic characteristics of the vehicle-bridge system significantly different from those of the vehicles or bridge alone, and is often detrimental to the safe operation of the vehicles. At present, due to the obvious trends of high-speed driving and lightweight vehicle bodies, the vehicles become more sensitive to wind loads. The operating speed of high-speed trains in China far exceeds the average operating speed of 240 km/h and the highest operating speed of 320 km/h in the world. In order to adapt to the high-speed operation of the trains, the electric multiple unit (EMU) adopts a lightweight structure of large hollow aluminum alloy profiles or stainless steel thin-walled cylinders, which reduces the weight of the EMU by 50% compared with traditional locomotive vehicles. The high speed of trains and the light weight of vehicle bodies make the trains more sensitive to the effects of wind loads. The safety risk of lightweight vehicles operating at high speeds on bridges under strong winds is greatly increased.

Conventional wind tunnel tests cannot effectively simulate the effect of crosswind on the moving vehicle-bridge system and the relative motion between the trains that meet and the surrounding environment. There is still a lack of simulation tests and analysis that can more realistically simulate the aerodynamic force of the trains operating under the crosswind.

To solve the technical problem, it is urgently needed to provide a novel system and method for testing aerodynamic characteristics of a high-speed moving vehicle-bridge system and subsidiary facilities thereof under a crosswind.

SUMMARY

An objective of the present invention is to provide a system and method for testing aerodynamic characteristics of a high-speed moving vehicle-bridge system and subsidiary facilities thereof under a crosswind. The present invention solves the technical problem that the prior art lacks a device to more realistically simulate the effect of the crosswind on the moving vehicle-bridge system and the relative motion between the trains that meet and the surrounding environment.

The present invention provides a system for testing aerodynamic characteristics of a high-speed moving vehicle-bridge system and subsidiary facilities thereof under a crosswind, including: a vehicle model, a starting mechanism, a buffer mechanism, a wind tunnel test section and guide rails, where the guide rails pass through the wind tunnel test section; the starting mechanism and the buffer mechanism are separately located at both ends of the guide rails; the guide rails include an acceleration section and a deceleration section; the starting mechanism is located in the acceleration section, and the buffer mechanism is located in the deceleration section; the vehicle model starts to run at the starting mechanism and stops at the buffer mechanism; an instantaneous speed of the vehicle model in the acceleration section is not less than 100 km/h.

Further, the starting mechanism includes a high-speed servo motor, rotating pulleys, an external toothed thrust plate and a high-strength rotating conveyor belt; the high-strength rotating conveyor belt is wound on the rotating pulleys; the high-speed servo motor is connected to a rotating pulley and drives the high-strength rotating conveyor belt to rotate through the rotating pulley; one end of the external toothed thrust plate is provided on the high-strength rotating conveyor belt and rotates synchronously with the high-strength rotating conveyor belt, and the other end is inserted into the vehicle model.

Further, there are at least two rotating pulleys; the high-strength rotating conveyor belt is ring-shaped and tightened by the rotating pulleys; the high-speed servo motor is connected to any rotating pulley and drives the high-strength rotating conveyor belt to rotate through the rotating pulley.

Optionally, the starting mechanism includes a compression ejection component and an ejection portion; the compression ejection component compresses the vehicle model on the ejection portion and then releases the vehicle model to run along the guide rails; the ejection portion includes a spring, a fixed plate and an ejection plate; the fixed plate is fixed to one end of the guide rails, and the ejection plate is provided at a rear end of the vehicle model; the spring is clamped between the fixed plate and the ejection plate.

Further, the compression ejection component includes a hook block, a lead screw and a motor; the hook block is fixedly connected to a bottom surface of the vehicle model; the motor is connected to the lead screw in a driving manner; the lead screw rotates around an axis thereof; the lead screw is fixedly connected to a hook plate, and the hook plate compresses the ejection portion with the rotation of the lead screw; the hook block is telescopically clamped on the hook plate.

Further, the buffer mechanism includes a flexible buffer plate and a buffer block; the buffer block is fixed to the other end of the guide rails; the flexible buffer plate is provided on an outer wall of the buffer block.

Further, the buffer mechanism includes a clamping slot; the clamping slot is provided in front of the buffer block and recessed into the guide rails; a clamping block is provided on the bottom surface of the vehicle model, and the clamping block is telescopically clamped with the clamping slot.

Further, the system for testing aerodynamic characteristics of a high-speed moving vehicle-bridge system and subsidiary facilities thereof under a crosswind further includes a test bridge span model; the guide rails are laid on the test bridge span model, and the test bridge span model passes through the wind tunnel test section.

Further, the system for testing aerodynamic characteristics of a high-speed moving vehicle-bridge system and subsidiary facilities thereof under a crosswind further includes two support frames; the support frames are installed on a bottom surface of the test bridge span model; the two adjacent support frames are located on two outer sides of the wind tunnel test section.

Further, the deceleration section is provided with brake friction devices; the brake friction devices brake the vehicle model passing through the wind tunnel test section by means of friction; the brake friction devices are deceleration friction plates made of polyurethane; a surface of the brake friction devices in contact with the vehicle model is wavy.

Further, the vehicle model includes a vehicle model housing, a model structure support girder, model structure support crossbeams, model dynamic pulleys, a dynamic pulley connecting rod and anti-derailing/rail holding devices; the model structure support girder and the model structure support crossbeams are interlaced to form a frame structure of the vehicle model; the vehicle model housing is located outside the frame structure; pairs of model dynamic pulleys are provided at the bottom of the frame structure; the pairs of model dynamic pulleys are connected by the dynamic pulley connecting rod; the frame structure is provided thereon with the anti-derailing/rail holding devices; the anti-derailing/rail holding devices are provided on an outer contour of the guide rails and are spaced from the guide rails; the model dynamic pulleys are engaged on the guide rails and can move on the guide rails along an axial direction thereof; the starting mechanism rests on the model structure support girder and provides initial motion power to the model structure support girder.

Further, the vehicle model includes a first vehicle model and a second vehicle model; the starting mechanism includes a first starting mechanism and a second starting mechanism; the buffer mechanism includes a first buffer mechanism and a second buffer mechanism; the wind tunnel test section includes a first wind tunnel test section and a second wind tunnel test section; the guide rails include first guide rails and second guide rails; the first guide rails include a first acceleration section and a first deceleration section; the first starting mechanism is located in the first acceleration section, and the first buffer mechanism is located in the first deceleration section; the second guide rails include a second acceleration section and a second deceleration section; the second starting mechanism is located in the second acceleration section, and the second buffer mechanism is located in the second deceleration section; the first guide rails and the second guide rails are spaced apart side by side; the first guide rails pass through the first wind tunnel test section, and the second guide rails pass through the second wind tunnel test section; the first wind tunnel test section and the second wind tunnel test section are spaced apart side by side; the first starting mechanism and the first buffer mechanism are respectively provided at a first end and a second end of the first guide rails; the second starting mechanism and the second buffer mechanism are respectively provided at a second end and a first end of the second guide rails; the first vehicle model runs along the first guide rails, and the second vehicle model runs along the second guide rails.

A total of 8 photoelectric sensors are installed in a wind tunnel to measure the speed of the vehicle model; four photoelectric sensors are arranged in each direction, of which two sensors are arranged near a side wall in the wind tunnel test section; each two of the photoelectric sensors are spaced by 0.5 m. After being ejected, the model passes through the sensors in sequence. In this way, the passing time of the model is measured, and the instantaneous speed of the vehicle model entering the wind tunnel test section is calculated. During the operation of the vehicle model in the test section, the speed of the vehicle model changes to some extent due to the effects of track friction and air drag. Through the sensors arranged over a long distance, the average running speed V of the model in the test section is obtained.

Further, a crosswind speed in the wind tunnel test section is 0-20 m/s.

Another aspect of the present invention further provides a test method for implementing the system for testing aerodynamic characteristics of a high-speed moving vehicle-bridge system and subsidiary facilities thereof under a crosswind, including the following steps:

S100: placing a vehicle model on a starting mechanism, and driving the vehicle model to run in an acceleration section through the starting mechanism;

S200: starting a wind tunnel test section to form a crosswind therein, and obtaining aerodynamic characteristic parameters when the vehicle model passes through the wind tunnel test section; and S300: allowing the vehicle model to decelerate in a deceleration section and stop at a buffer mechanism.

The present invention has the following technical effects:

The present invention provides a device for testing aerodynamic characteristics of a vehicle-bridge system under a crosswind by a wind tunnel test. The train test model is provided on the bridge model track. The model starting mechanism is provided at one end of the model. The starting mechanism enables the motor to drive the lead screw to rotate. The hook plate installed on the lead screw moves linearly, driving the hook block and the vehicle model to compress the ejection plate and the spring on the model starting mechanism to move to a far end. When the spring reaches a predetermined amount of compression required for the test, the hook plate and the hook block are disengaged, so that the vehicle model pops up quickly, and enters the wind tunnel test section from a side of the wind tunnel along the track to undergo the wind tunnel test. After the vehicle model passes through the wind tunnel test section, it continues to move along the track. When the head of the model hits the flexible buffer plate and the buffer block, the model decelerates and stops. Meanwhile, the clamping block on the vehicle model enters the clamping slot, so that the vehicle model is basically fixed and will not move in the reverse direction. The present invention utilizes a wind tunnel laboratory to effectively simulate the running state of the train under the crosswind, providing the possibility of exploring the aerodynamic characteristics of trains running on the bridge under the crosswind.

The method of the present invention is simple to implement, easy to control, high in test accuracy, and realizes the acceleration of the train from static to 35 m/s high speed and the rapid deceleration from high speed to static. In addition, the crosswind speed applied to the test train is freely switched in the range of 0-20 m/s, which effectively reflects the true state of the trains running and meeting on the bridge under the crosswind. Compared with the existing vehicle acceleration devices and methods, the present invention has a short acceleration distance, and can instantaneously accelerate a vehicle model of tens of kilograms to a speed of hundreds of kilometers per hour in a very short acceleration distance. In addition, the present invention is not limited by the shapes of the vehicles and subsidiary facilities, and the shape of the model can be freely changed according to the test needs of different test purposes. Overall, the present invention is suitable for ultra-short test distances while meeting the speed requirements, reducing the design costs and improving the test safety. The present invention drives the test model by means of inertial, which features strong drive, short time and fast speed. The driving force is not directly exerted to the vehicle model, which maintains the integrity of the test model housing during the test process and ensures that the data are true, reasonable and effective. The acceleration is completed in a short time and a short distance due to the easy-to-implement acceleration method and the high driving efficiency. The present invention simulates the operation of the trains on the track according to the actual running conditions of trains. Such a driving method saves energy, avoids generating a lot of noise, and improves the test efficiency.

The test system and method provided by the present invention carry out the simulation tests (wind tunnel tests) of the bridge and the train through scale models, and realize the simulation of the aerodynamic characteristics of the moving vehicle-bridge system under real operating conditions.

In order to make the present invention more comprehensible, the embodiments of the device for testing aerodynamic characteristics of a vehicle-bridge system under a crosswind by a wind tunnel test according to the present invention are described in detail below.

REFERENCE NUMERALS 1. vehicle model; 2. starting mechanism; 3. buffer mechanism; 4. wind tunnel test section; 41. first wind tunnel test section; 42. second wind tunnel test section; 5. guide rails; 51. first guide rails; 52. second guide rails; 6. test bridge span model; 61. first test bridge span model; 62. second test bridge span model; 7. support frame; 8. brake friction device; 11. bridge body; 12. acceleration section; 13. deceleration section; 14. vehicle model housing; 15. model structure support girder; 16. model structure support crossbeam; 17. model dynamic pulley; 18. dynamic pulley connecting rod; 19. anti-derailing/rail holding device; 21. high-speed servo motor; 22. rotating pulley; 23. external toothed thrust plate; 24. high-strength rotating conveyor belt; 120. clamping block; 210. ejection plate; 220. spring; 230. fixed plate; 240. hook block; 250. lead screw; 260. motor; 270. hook plate; 310. buffer block; 320. flexible buffer plate; and 330. clamping slot.

DETAILED DESCRIPTION OF THE EMBODIMENTS

The accompanying drawings constituting a part of the application provide further understanding of the present invention. The schematic embodiments of the invention and description thereof are intended to be illustrative of the present invention and do not constitute an undue limitation of the present invention.

Embodiment 1

Figure 1:
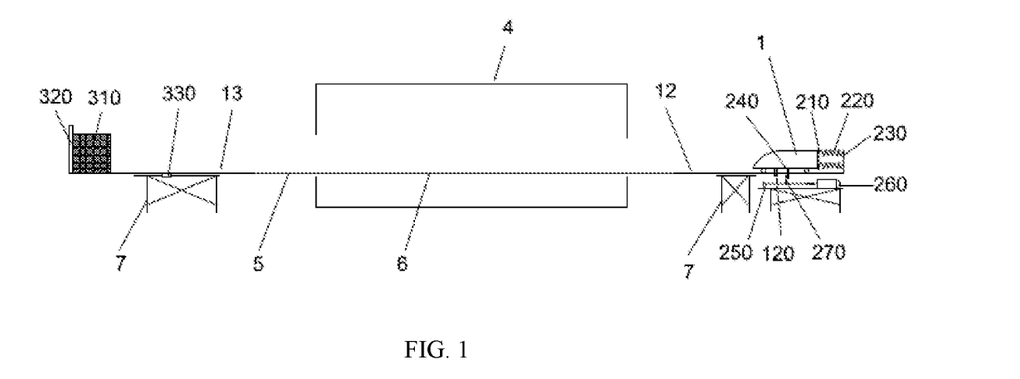
FIG. 1 is a structural diagram of a device for testing aerodynamic characteristics of a vehicle-bridge system under a crosswind by a wind tunnel test according to Embodiment 1 of the present invention.

Referring to FIG. 1, the present invention provides a device for testing aerodynamic characteristics of a vehicle-bridge system under a crosswind by a wind tunnel test, including: a vehicle model 1, a starting mechanism 2, a buffer mechanism 3, a wind tunnel test section 4 and guide rails 5, where the guide rails 5 pass through the wind tunnel test section 4; the starting mechanism and the buffer mechanism are separately located at both ends of the guide rails 5; the guide rails 5 include an acceleration section 12 and a deceleration section 13; the starting mechanism is located in the acceleration section 12, and the buffer mechanism is located in the deceleration section 13; the vehicle model 1 starts to run at the starting mechanism and stops at the buffer mechanism; the starting mechanism includes a compression ejection component and an ejection portion; the compression ejection component compresses the vehicle model 1 on the ejection portion and then releases the vehicle model 1 to run along the guide rails 5.

Figure 5:
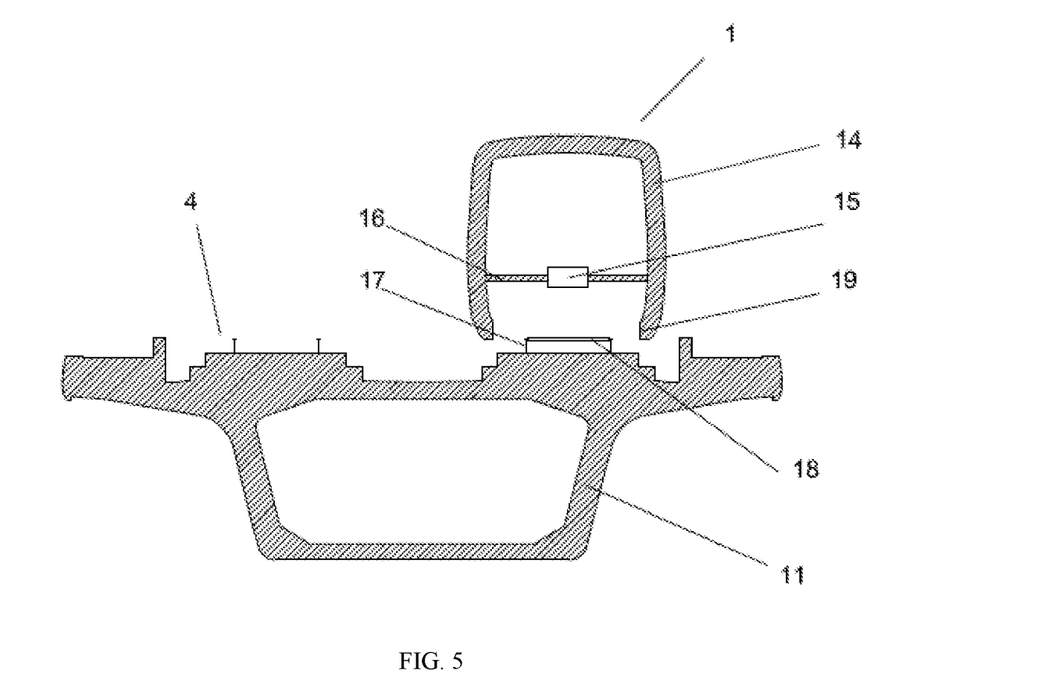
FIG. 5 is a cross-sectional view of a device for testing aerodynamic characteristics of a vehicle-bridge system under a crosswind by a wind tunnel test according to the present invention.

In the present invention, a train refers to any vehicle that can travel on the guide rails. Specifically, in this embodiment, the train is the vehicle model 1. Referring to FIG. 5, the vehicle model 1 includes a vehicle model housing 14, a model structure support girder 15, model structure support crossbeams 16, model dynamic pulleys 17, a dynamic pulley connecting rod 18 and anti-derailing/rail holding devices 19; the model structure support girder 15 and the model structure support crossbeams 16 are interlaced to form a frame structure of the vehicle model 1; the vehicle model housing 14 is located outside the frame structure; pairs of model dynamic pulleys 17 are provided at the bottom of the frame structure; the pairs of model dynamic pulleys 17 are connected by the dynamic pulley connecting rod 18; the frame structure is provided thereon with the anti-derailing/rail holding devices 19; the anti-derailing/rail holding devices 19 are provided on an outer contour of the guide rails 5 and are spaced from the guide rails 5; the model dynamic pulleys 17 are engaged on the guide rails 5 and can move on the guide rails 5 along an axial direction of the guide rails 5; the starting mechanism rests on the model structure support girder 15 and provides initial motion power to the model structure support girder 15.

The device enables the train to run on the bridge at a certain speed in a wind tunnel, and the ejection portion converts potential energy into kinetic energy, thereby providing the initial speed of the train running on the track. The acceleration and deceleration functions of the train in the wind tunnel test section 4 are realized as the vehicle model 1 runs on the track. After the train passes through the wind tunnel test section 4, the buffer mechanism increases the drag and slows the train down to realize the parking function of the train. The starting mechanism can be an existing mechanism that compresses a spring 220 and converts the compression potential energy into kinetic energy. The buffer mechanism can be a component made of various flexible buffer materials. The compression ejection component only needs to be capable of compressing the ejection portion. In an embodiment, the compression ejection component can compress the ejection portion by pushing back the vehicle model 1. The guide rails 5 ensure that the model vehicle runs smoothly at a certain speed in the wind tunnel. The vehicle model 1 is a model of a high-speed vehicle, which is one of the main research objects. The guide rails 5 pass through two side walls of the wind tunnel test section 4 with a larger distance to maximize the use of the length of the wind tunnel section and increase the effective test length.

Preferably, the wind tunnel test section 4 carries out the simulation with a crosswind wind speed of 0-20 m/s, which effectively achieves the wind tunnel test on the aerodynamic characteristics of the moving vehicle-bridge system under the crosswind.

Preferably, the ejection portion includes a spring 220, a fixed plate 230 and an ejection plate 210; the fixed plate 230 is fixed to one end of the guide rails 5, and the ejection plate 210 is provided at a rear end of the vehicle model 1; the spring 220 is clamped between the fixed plate 230 and the ejection plate 210. The ejection portion ejects the train in the direction of the track at a certain initial speed, and converts the elastic potential energy of the train into kinetic energy to provide the initial test speed of the train in the wind tunnel.

Preferably, the compression ejection component includes a hook block 240, a lead screw and a motor 260; the hook block 240 is fixedly connected to a bottom surface of the vehicle model 1; the motor 260 is connected to the lead screw in a driving manner; the lead screw 250 rotates around an axis thereof; the lead screw 250 is fixedly connected to a hook plate 270, and the hook plate 270 compresses the ejection portion with the rotation of the lead screw 250; the hook block 240 is telescopically clamped on the hook plate 270.

The motor 260 is used to drive the lead screw 250 to rotate. The hook plate 270 installed on the lead screw 250 moves linearly, driving the hook block 240 and the vehicle model 1 to compress the ejection portion. When the ejection portion reaches a predetermined amount of compression required for the test, the hook plate 270 and the hook block 240 are disengaged, so that the vehicle model 1 pops up quickly, and enters the wind tunnel test section 4 from a side of the track to undergo the wind tunnel test.

Preferably, the deceleration section 13 is provided with brake friction devices 8; the brake friction devices brake the vehicle model 1 passing through the wind tunnel test section 4 by means of friction; the brake friction devices 8 are deceleration friction plates made of polyurethane; a surface of the brake friction devices 8 in contact with the vehicle model 1 is wavy.

Preferably, the buffer mechanism includes a flexible buffer plate 320 and a buffer block 310; the buffer block 310 is fixed to the other end of the guide rails 5; the flexible buffer plate 320 is provided on an outer wall of the buffer block 310.

The buffer mechanism reduces the running speed of the vehicle model 1 and causes the vehicle model to enter the deceleration phase faster.

Preferably, the buffer mechanism includes a clamping slot 330; the clamping slot 330 is provided in front of the buffer block 310 and recessed into the guide rails 5; a clamping block 120 is provided on the bottom surface of the vehicle model 1, and the clamping block 120 is telescopically clamped with the clamping slot 330.

In a specific embodiment, after the vehicle model 1 passes through the wind tunnel test section 4, it continues to move along the guide rails. When the head of the vehicle model 1 hits the flexible buffer plate 320 and the buffer mechanism, the vehicle model 1 decelerates and stops. Meanwhile, the clamping block 120 on the vehicle model 1 is clamped in the clamping slot 330, so that the vehicle model 1 is basically fixed and will not move in the reverse direction.

Preferably, the device for testing aerodynamic characteristics of a vehicle-bridge system under a crosswind by a wind tunnel test further includes a test bridge span model 6; the guide rails 5 are laid on the test bridge span model 6, and the test bridge span model 6 passes through the wind tunnel test section 4.

The typical model of a high-speed bridge includes a bridge body and a bridge deck track system (dual-track railway), which effectively simulates the actual conditions and improves the accuracy of test results. The bridge model effectively simulates the high-speed movement of the train on the bridge and the influence of the crosswind on the vehicle-bridge system, and realizes the effective wind tunnel test on the aerodynamic characteristics of the moving vehicle-bridge system under the crosswind. The guide rails 5 are in seamed/seamless connection with the test bridge span model 6.

Preferably, the device for testing aerodynamic characteristics of a vehicle-bridge system under a crosswind by a wind tunnel test further includes two support frames 7; the support frames 7 are installed on a bottom surface of the test bridge span model 6; the two adjacent support frames 7 are located on two outer sides of the wind tunnel test section 4. The support frames 7 allow the test bridge span model 6 to be far away from the ground, thereby better simulating the bridge structure. In order to use the wind tunnel test section conveniently, reasonably and effectively, the support frames are connected to external track support frames through a snap-on component. In addition, the support frames are electromagnetically attached to the ground of the wind tunnel, ensuring the test stability and facilitating disassembly.

Figure 2:
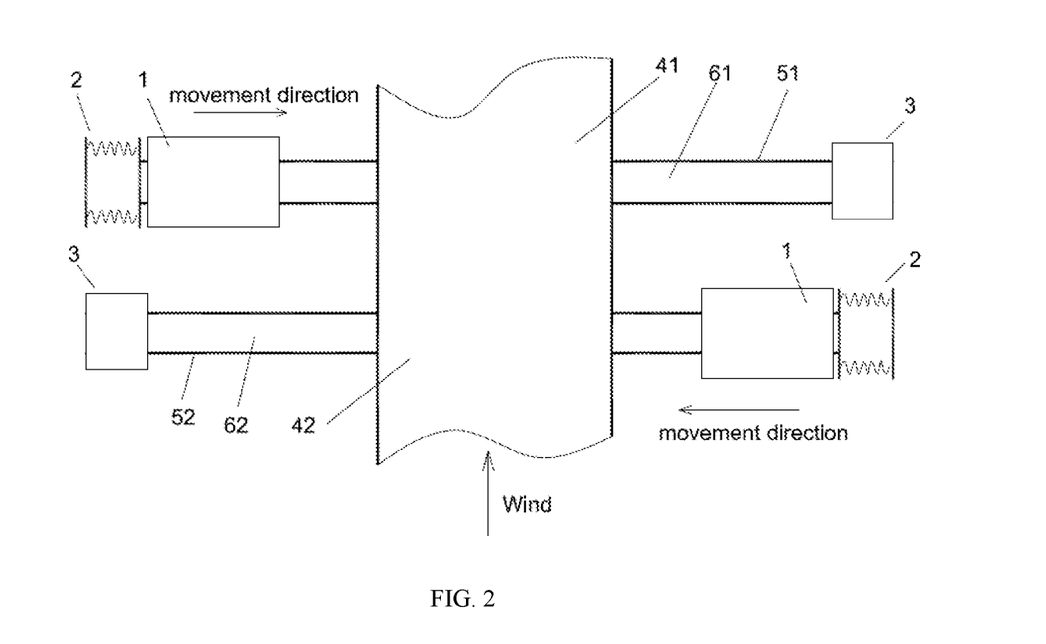
FIG. 2 is another structural diagram of a device for testing aerodynamic characteristics of a vehicle-bridge system under a crosswind by a wind tunnel test according to Embodiment 1 of the present invention.

Referring to FIG. 2, preferably, the starting mechanism includes a first starting mechanism and a second starting mechanism; the buffer mechanism includes a first buffer mechanism and a second buffer mechanism; the wind tunnel test section 4 includes a first wind tunnel test section 41 and a second wind tunnel test section 42; the guide rails 5 include first guide rails 51 and second guide rails 52; the first guide rails 51 include a first acceleration section and a first deceleration section; the first starting mechanism is located in the first acceleration section, and the first buffer mechanism is located in the first deceleration section; the second guide rails include a second acceleration section and a second deceleration section; the second starting mechanism is located in the second acceleration section, and the second buffer mechanism is located in the second deceleration section; the first guide rails 5 and the second guide rails 52 are spaced apart side by side; the first guide rails 51 pass through the first wind tunnel test section 41, and the second guide rails 52 pass through the second wind tunnel test section 42; the first wind tunnel test section 41 and the second wind tunnel test section 42 are spaced apart side by side in the same wind tunnel; the first starting mechanism and the first buffer mechanism are respectively provided at a first end and a second end of the first guide rails 51; the second starting mechanism and the second buffer mechanism are respectively provided at a second end and a first end of the second guide rails 52.

By providing the side-by-side guide rails 5 that allow the vehicle models 1 to run in opposite directions, the aerodynamic characteristics of two meeting trains are simulated. The aerodynamic characteristics of the two trains traveling in the same direction can also be simulated by reversing one of the guide rails, one of the buffer mechanisms and one of the starting mechanisms.

Preferably, the test bridge span model 6 includes a first test bridge span model 61 and a second test bridge span model 62; the first guide rails 5 are provided on the first test bridge span model 61, and the second guide rails 5 are provided on the second test bridge span model 62.

By providing the guide rails 5 on the bridge model, the conditions of the trains meeting on the bridge can be simulated, so as to obtain more accurate aerodynamic characteristic parameters.

The device provided by the present invention is verified according to specific embodiments below, where the wind tunnel provides a crosswind speed of 0-20 m/s for simulation.

Referring to FIG. 1, the motor 260 is used to drive the lead screw 250 to rotate. The hook plate 270 installed on the lead screw 250 moves linearly, driving the hook block 240 and the vehicle model 1 to compress the ejection plate 210 and the spring 220 on the model starting mechanism. When the spring 220 reaches a predetermined amount of compression required for the test, the hook plate 270 and the hook block 240 are disengaged, so that the vehicle model 1 pops up quickly, and enters the wind tunnel test section 4 from a side of the track to undergo the wind tunnel test. After the vehicle model 1 passes through the wind tunnel test section 4, it continues to move along the track. When the head of the model hits the flexible buffer plate 320 and the buffer mechanism, the model decelerates and stops. Meanwhile, the clamping block 120 on the vehicle model 1 is clamped in the clamping slot 330, so that the vehicle model 1 is basically fixed and will not move in the reverse direction.

FIG. 2 is a second structural diagram of the device for testing aerodynamic characteristics of a vehicle-bridge system under a crosswind according to the present invention. The support frames 7 are evenly arranged at a lower end of the test bridge span model 6. The guide rails are provided on the support frames 7, and the starting mechanism and the buffer mechanism are provided at both ends of the guide rails 5. The vehicle model 1 is placed in front of the starting mechanism. The ejection plate 210 is provided at a contact portion of the starting mechanism with the vehicle model 1. The test bridge span model 6 includes a bridge body 11. The guide rails 5 pass through the wind tunnel, and the wind tunnel provides a crosswind speed of 0-20 m/s for the simulation.

Embodiment 2

Figure 3:
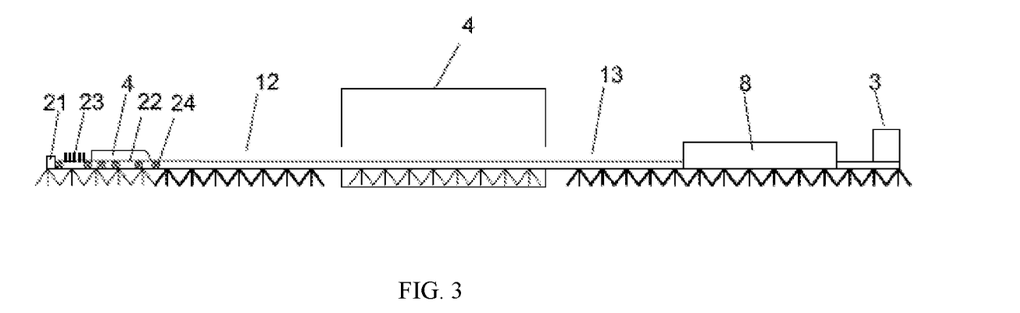
FIG. 3 is a structural diagram of a device for testing aerodynamic characteristics of a vehicle-bridge system under a crosswind by a wind tunnel test according to Embodiment 2 of the present invention.
Figure 4:
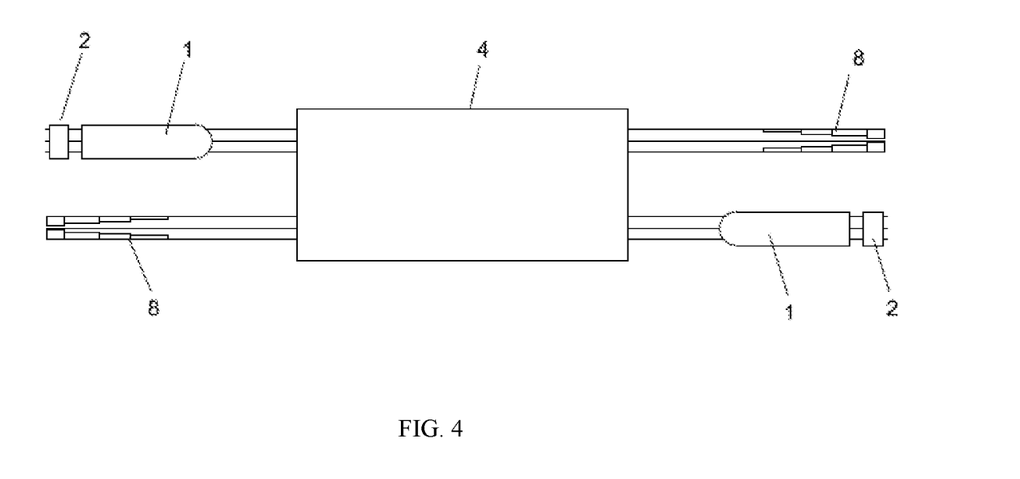
FIG. 4 is another structural diagram of a device for testing aerodynamic characteristics of a vehicle-bridge system under a crosswind by a wind tunnel test according to Embodiment 2 of the present invention.

As shown in FIGS. 3 and 4, this embodiment differs from Embodiment 1 in that, the starting mechanism includes a high-speed servo motor 21, rotating pulleys 22, an external toothed thrust plate 23 and a high-strength rotating conveyor belt 24. The high-strength rotating conveyor belt 24 is wound on the rotating pulleys 22; the high-speed servo motor 21 is connected to a rotating pulley 22 and drives the high-strength rotating conveyor belt 24 to rotate through the rotating pulley 22; one end of the external toothed thrust plate 23 is provided on the high-strength rotating conveyor belt 24 and rotates synchronously with the high-strength rotating conveyor belt 24, and the other end is inserted into the vehicle model 1. There are at least two rotating pulleys 22; the high-strength rotating conveyor belt 24 is ring-shaped and tightened by the rotating pulleys 22; the high-speed servo motor 21 is connected to any rotating pulley 22 and drives the high-strength rotating conveyor belt 24 to rotate through the rotating pulley 22.

In order to ensure the rotation stability of the high-strength rotating conveyor belt 24 and avoid instability due to the excessive speed of the high-speed servo motor 21 and the length deviation of the high-strength rotating conveyor belt 24, a plurality of rotating pulleys 22 are sequentially arranged according to different intervals. A clamping bar is provided between the rotating pulleys 22 to ensure mating matching.

The vehicle model 1 is located at an initial starting position of the acceleration section 12 on the guide rails 5, and the high-speed servo motor 21 is located at a rear end of the initial position of the acceleration section 12. The rotating pulleys 22 and the high-strength rotating conveyor belt 24 are located at the bottom of the vehicle model 1. The external toothed thrust plate 23 and the model structure support girder 15 are tightly fit together. The high-speed servo motor 21 is remotely controlled to rotate at a high speed, driving the rotating pulleys 22 and the high-strength rotating conveyor belt 24 to rotate at a high speed. By driving the external toothed thrust plate 23, the vehicle model 1 is accelerated forward. The vehicle model 1 is accelerated to a predetermined test speed, and then automatically detaches from the high-strength rotating conveyor belt 24. After the vehicle model 1 is detached, the high-speed servo motor 21 and the high-strength rotating conveyor belt 24 decelerate and stop, and the vehicle model 1 continues to move forward into the wind tunnel test section 4. After passing through the wind tunnel test section 4, the vehicle model 1 enters the deceleration section 13, and contacts and rubs with the brake friction devices 8 in the deceleration section 13, thereby being decelerated. In order to realize the safe buffering of the vehicle model 1, the brake friction devices 8 are arranged with intervals decreasing in sequence, so as to achieve the purpose of decelerating and braking.

Figure 6:
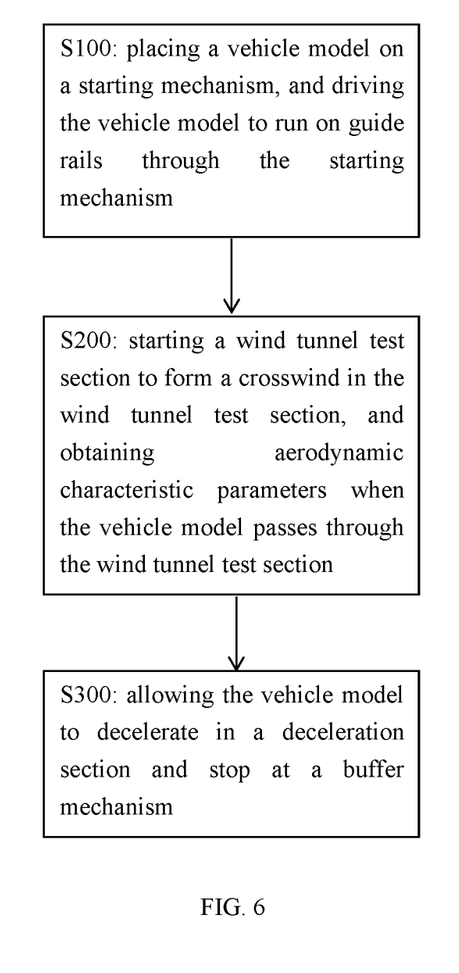
FIG. 6 is a flow chart showing a test method for implementing the system for testing the aerodynamic characteristics of the high-speed moving vehicle-bridge system and subsidiary facilities thereof under the crosswind according to the present invention.

Another aspect of the present invention further provides a test method for implementing the device for testing aerodynamic characteristics of a vehicle-bridge system under a crosswind by a wind tunnel test, including the following steps:

S100: place a vehicle model 1 on a starting mechanism, and drive the vehicle model to run in an acceleration section 12 through the starting mechanism;

S200: start a wind tunnel test section 4 to form a crosswind therein, and obtain aerodynamic characteristic parameters when the vehicle model passes through the wind tunnel test section 4; and S300: allow the vehicle model to decelerate in a deceleration section 13 and stop at buffer mechanism.

Specifically, this method includes: place the vehicle model 1 on the starting mechanism, and drive the vehicle model to run in the acceleration section 12 through the starting mechanism; start a wind tunnel to provide a crosswind speed of 0-20 m/s in the wind tunnel test section; allow the vehicle model to run along guide rails and pass through the wind tunnel test section; obtain aerodynamic characteristic parameters of the vehicle model passing through the wind tunnel test section 4; and allow the vehicle model after passing through the wind tunnel test section 4 to decelerate in the deceleration section 13 and hit the buffer mechanism to stop moving. The crosswind refers to a wind moving along a cross axis of the vehicle model. Those skilled in the art should understand that the scope of the present invention is not limited to the above embodiments, and several changes and modifications can be made without departing from the scope of the present invention as defined by the appended claims. Although the present invention is described in detail in the drawings and the specification, such description is merely illustrative or schematic, rather than restrictive, and the present invention is not limited to the disclosed embodiments.

Through the description in the drawings, the description and the claims, those skilled in the art can understand and implement variations of the disclosed embodiments when implementing the present invention. In the claims, the term "comprising" does not exclude other steps or elements, and the indefinite article "a" or "an" does not exclude a plurality. The fact that certain measures are cited in mutually different dependent claims does not mean that these measures cannot be combined. Any reference signs in the claims do not limit the scope of the present invention.

What is claimed is:

1. A system for testing aerodynamic characteristics of a high-speed moving vehicle-bridge system and subsidiary facilities of the high-speed moving vehicle-bridge system under a crosswind, comprising a vehicle model, a starting mechanism, a buffer mechanism, a wind tunnel test section and guide rails, wherein
   the guide rails pass through the wind tunnel test section; the starting mechanism and the buffer mechanism are separately located at both ends of the guide rails;
   the guide rails comprise an acceleration section and a deceleration section; the starting mechanism is located in the acceleration section, and the buffer mechanism is located in the deceleration section; the vehicle model starts to run at the starting mechanism and stops at the buffer mechanism; and
   an instantaneous speed of the vehicle model in the acceleration section is not less than 100 km/h; wherein,
   the buffer mechanism comprises a flexible buffer plate and a buffer block; the buffer block is fixed to the other end of the guide rails; and the flexible buffer plate is provided on an outer wall of the buffer block.

2. The system according to claim 1, wherein the starting mechanism comprises a high-speed servo motor, rotating pulleys, an external toothed thrust plate and a high-strength rotating conveyor belt; wherein,
   a high-strength rotating conveyor belt is wound on the rotating pulleys; the high-speed servo motor is connected to the rotating pulleys and drives the high-strength rotating conveyor belt to rotate through the rotating pulleys; and
   a first end of the external toothed thrust plate is provided on the high-strength rotating conveyor belt and rotates synchronously with the high-strength rotating conveyor belt, and a second end of the external toothed thrust plate is inserted into the vehicle model.

3. The system according to claim 2, wherein the starting mechanism comprises at least two rotating pulleys; the high-strength rotating conveyor belt is ring-shaped and tightened by the rotating pulleys; and the high-speed servo motor is connected to a drive rotating pulley of the at least two rotating pulleys and drives the high-strength rotating conveyor belt to rotate through the drive rotating pulley.

4. The system according to claim 1, wherein the starting mechanism comprises a compression ejection component and an ejection portion; wherein,
   the compression ejection component is configured to compress the vehicle model on the ejection portion and then is configured to release the vehicle model to run along the guide rails;
   the ejection portion comprises a spring, a fixed plate and an ejection plate; wherein the fixed plate is fixed to one end of the guide rails, and the ejection plate is provided at a rear end of the vehicle model; the spring is clamped between the fixed plate and the ejection plate;
   the compression ejection component comprises a hook block, a lead screw and a motor; the hook block is fixedly connected to a bottom surface of the vehicle model; the motor is connected to the lead screw in a drive manner; the lead screw rotates around an axis of the lead screw; the lead screw is fixedly connected to a hook plate; the hook plate compresses the ejection portion with the rotation of the lead screw; and the hook block is telescopically clamped on the hook plate.

5. The system according to claim 1, wherein the buffer mechanism further comprises a clamping slot; the clamping slot is provided in front of the buffer block and recessed into the guide rails; a clamping block is provided on a bottom surface of the vehicle model, and the clamping block is telescopically clamped with the clamping slot.

6. The system according to claim 1, further comprising a test bridge span model; the guide rails are laid on the test bridge span model, and the test bridge span model passes through the wind tunnel test section.

7. The system according to claim 6, further comprising two support frames; the two support frames are installed on a bottom surface of the test bridge span model; the two support frames are located on two outer sides of the wind tunnel test section; and the two support frames are connected to external track support frames through a snap-on component, and are electromagnetically attached to the ground of a wind tunnel.

8. The system according to claim 1, wherein the vehicle model comprises a vehicle model housing, a model structure support girder, model structure support crossbeams, model dynamic pulleys, a dynamic pulley connecting rod and anti-derailing/rail holding devices; wherein
   the model structure support girder and the model structure support crossbeams are interlaced to form a frame structure of the vehicle model; the vehicle model housing is located outside the frame structure; pairs of model dynamic pulleys are provided at the bottom of the frame structure; the pairs of model dynamic pulleys are connected by the dynamic pulley connecting rod; the frame structure is provided with the anti-derailing/rail holding devices; the anti-derailing/rail holding devices are provided on an outer contour of the guide rails and are spaced from the guide rails; the model dynamic pulleys are engaged on the guide rails and can move on the guide rails along an axial direction thereof; the starting mechanism rests on the model structure support girder and provides initial motion power to the model structure support girder.

9. The system according to claim 1, wherein the vehicle model comprises a first vehicle model and a second vehicle model; the starting mechanism comprises a first starting mechanism and a second starting mechanism; the buffer mechanism comprises a first buffer mechanism and a second buffer mechanism; the wind tunnel test section comprises a first wind tunnel test section and a second wind tunnel test section; the guide rails comprise first guide rails and second guide rails; the first guide rails comprise a first acceleration section and a first deceleration section; the first starting mechanism is located in the first acceleration section, and the first buffer mechanism is located in the first deceleration section; the second guide rails comprise a second acceleration section and a second deceleration section; the second starting mechanism is located in the second acceleration section, and the second buffer mechanism is located in the second deceleration section; the first guide rails and the second guide rails are spaced apart side by side; the first guide rails pass through the first wind tunnel test section, and the second guide rails pass through the second wind tunnel test section; the first wind tunnel test section and the second wind tunnel test section are spaced apart side by side in the same wind tunnel; the first starting mechanism and the first buffer mechanism are respectively provided at a first end and a second end of the first guide rails; the second starting mechanism and the second buffer mechanism are respectively provided at a second end and a first end of the second guide rails; the first vehicle model runs along the first guide rails, and the second vehicle model runs along the second guide rails.

10. The system according to claim 1, wherein the wind tunnel test section is provided with photoelectric sensors to measure a speed of the vehicle model; four photoelectric sensors are arranged on each side wall of the wind tunnel test section; each two photoelectric sensor of the photoelectric sensors are spaced by 0.5 m; a speed of the crosswind in the wind tunnel test section is 0-20 m/s.

11. A test method for implementing the system according to claim 1, comprising the following steps:
S100: placing the vehicle model on the starting mechanism, and driving the vehicle model to run on the guide rails through the starting mechanism;
S200: starting the wind tunnel test section to form the crosswind in the wind tunnel test section, and obtaining aerodynamic characteristic parameters when the vehicle model passes through the wind tunnel test section; and
S300: allowing the vehicle model to decelerate in a deceleration section and stop at a buffer mechanism.

12. A system for testing aerodynamic characteristics of a high-speed moving vehicle-bridge system and subsidiary facilities of the high-speed moving vehicle-bridge system under a crosswind, comprising a vehicle model, a starting mechanism, a buffer mechanism, a wind tunnel test section and guide rails, wherein
the guide rails pass through the wind tunnel test section; the starting mechanism and the buffer mechanism are separately located at both ends of the guide rails;
the guide rails comprise an acceleration section and a deceleration section; the starting mechanism is located in the acceleration section, and the buffer mechanism is located in the deceleration section; the vehicle model starts to run at the starting mechanism and stops at the buffer mechanism; and
an instantaneous speed of the vehicle model in the acceleration section is not less than 100 km/h; wherein the deceleration section is provided with brake friction devices; the brake friction devices brake the vehicle model passing through the wind tunnel test section by means of friction; the brake friction devices are deceleration friction plates made of polyurethane; and a surface of the brake friction devices in contact with the vehicle model is wavy.

* * * * *